(12) United States Patent
Nishikawa

(10) Patent No.: US 7,953,901 B2
(45) Date of Patent: May 31, 2011

(54) DISTRIBUTION APPARATUS, IMAGE PROCESSING APPARATUS, MONITORING SYSTEM, AND INFORMATION PROCESSING METHOD

(75) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 12/349,404

(22) Filed: Jan. 6, 2009

(65) Prior Publication Data

US 2009/0177806 A1 Jul. 9, 2009

(30) Foreign Application Priority Data

Jan. 7, 2008 (JP) ................................. 2008-000678

(51) Int. Cl.
*G06F 3/00* (2006.01)
(52) U.S. Cl. .................. 710/8; 710/9; 710/10; 717/168; 717/170; 717/174; 717/176
(58) Field of Classification Search .................. None
See application file for complete search history.

(56) References Cited

U.S. PATENT DOCUMENTS

| | | | | |
|---|---|---|---|---|
| 2002/0103969 A1* | 8/2002 | Koizumi et al. | | 711/114 |
| 2005/0132091 A1* | 6/2005 | Shibata | | 710/4 |
| 2006/0002340 A1* | 1/2006 | Criss et al. | | 370/328 |
| 2008/0189693 A1* | 8/2008 | Pathak | | 717/168 |
| 2009/0136042 A1* | 5/2009 | Veillette | | 380/279 |

FOREIGN PATENT DOCUMENTS

| | | |
|---|---|---|
| JP | 2003-091427 A | 3/2003 |
| JP | 2004-165734 A | 6/2004 |
| JP | 2005-182163 A | 7/2005 |

OTHER PUBLICATIONS

IBM, Nondisruptive Migration Agent for CMVC and Like Products, Apr. 22, 2003, IP.com, pp. 1-2.*

* cited by examiner

*Primary Examiner* — Eron J Sorrell
(74) *Attorney, Agent, or Firm* — Canon USA Inc. IP Division

(57) ABSTRACT

A distribution apparatus includes a firmware distribution unit distributing firmware corresponding to a post-update version of firmware included in an acquisition request to an image processing apparatus; a determination unit determining whether migration of setup information stored in a storage unit in the image processing apparatus is necessary in the update of the firmware from a pre-update version currently applied to the image processing apparatus to the post-update version on the basis of the pre-update version, the post-update version, and data on the setup information in which combinations of the versions of firmware are associated with information indicating whether the migration of the setup information is necessary; and a setup-migration-program distribution unit distributing a setup migration program involved in the migration of the setup information to the image processing apparatus if the determination unit determines that the migration is necessary.

6 Claims, 15 Drawing Sheets

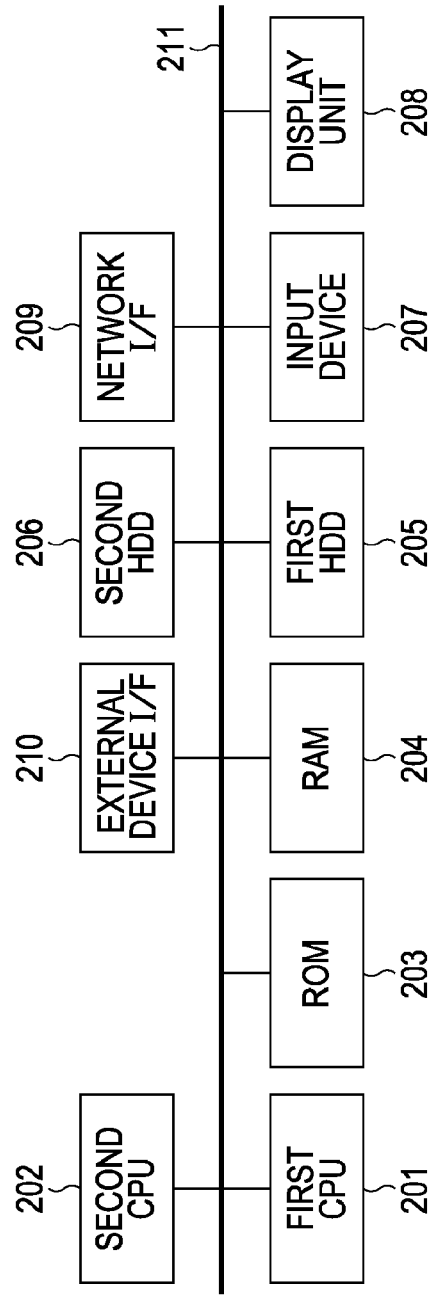
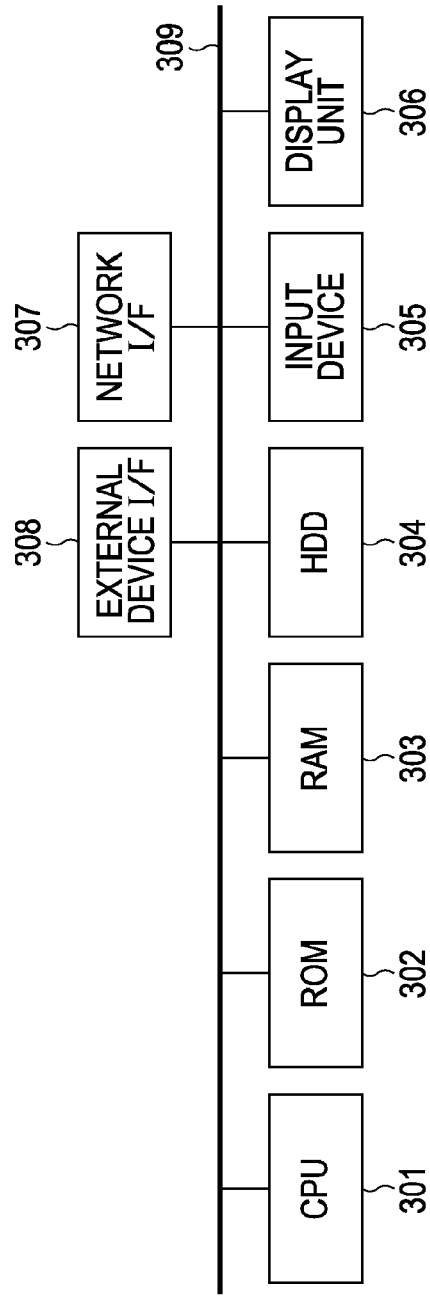

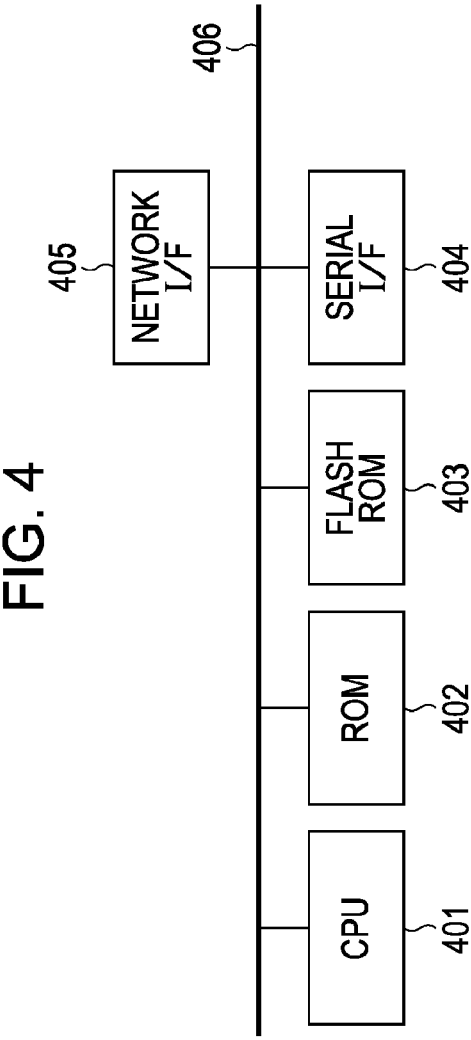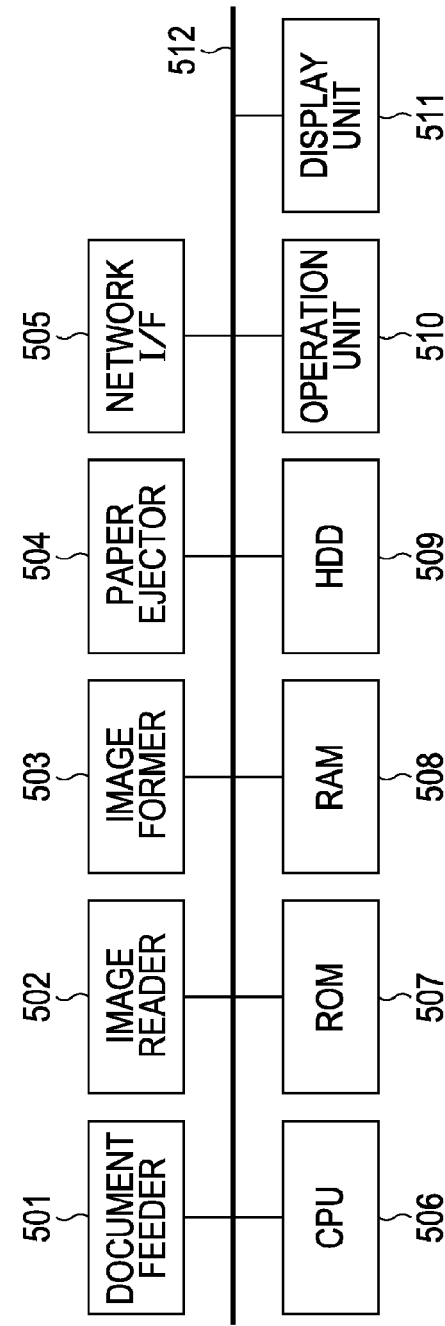

FIG. 15

CONFIGURATION INFORMATION TABLE

| PRE-UPDATE VERSION | POST-UPDATE VERSION | | | | |
|---|---|---|---|---|---|
| | 1.0 | 1.1 | 1.2 | 1.3 | 1.4 |
| 1.0 | | ○ | | | |
| 1.1 | | | × | × | × |
| 1.2 | | | | × | × |
| 1.3 | | | | | × |
| 1.4 | | | | | |

FIG. 16

SETUP MIGRATION PROGRAM TABLE

| PRE-UPDATE VERSION \ POST-UPDATE VERSION | 1.0 | 1.1 | 1.2 | 1.3 | 1.4 |
|---|---|---|---|---|---|
| 1.0 | | NONE | × | × | × |
| 1.1 | | | A | × | × |
| 1.2 | | | | B | × |
| 1.3 | | | | | C |
| 1.4 | | | | | |

FIG. 19A  VERSION 1.0

- APPLICATION A
- APPLICATION B
- APPLICATION C
- APPLICATION D
- APPLICATION E
- APPLICATION F

SETUP MIGRATION PROGRAM A

FIG. 19B  VERSION 1.2

- APPLICATION A
- APPLICATION B
- APPLICATION C
- APPLICATION D
- APPLICATION E
- APPLICATION F

SETUP MIGRATION PROGRAM B

FIG. 19C  VERSION 1.3

- APPLICATION A
- APPLICATION B
- APPLICATION C
- APPLICATION D
- APPLICATION E
- APPLICATION F

SETUP MIGRATION PROGRAM C

FIG. 19D  VERSION 1.4

- APPLICATION A
- APPLICATION B
- APPLICATION C
- APPLICATION D
- APPLICATION E
- APPLICATION F

DISTRIBUTION APPARATUS, IMAGE PROCESSING APPARATUS, MONITORING SYSTEM, AND INFORMATION PROCESSING METHOD

BACKGROUND OF THE INVENTION

1. Field of the Invention

The present invention relates to a distribution apparatus, an image processing apparatus, a monitoring system, and an information processing method, more specifically, distributing firmware.

2. Description of the Related Art

Monitoring systems that remotely monitor the operating states of peripheral apparatuses, such as image processing apparatuses, are proposed in related art. Under the environment of such a monitoring system, the firmware of an image processing apparatus is updated in the following manner. For example, if it is necessary to update the firmware due to upgrade or failure, a service man visits a customer site and manually updates the firmware. Accordingly, the cost of the update of the firmware has increased.

Japanese Patent Laid-Open No. 2004-165734 discloses a technology for suppressing a decrease in productivity when it is necessary to urgently update firmware.

Japanese Patent Laid-Open No. 2003-091427 discloses a technology for reliably updating the firmware of an information processing apparatus (printer) without imposing an increased burden on an operator and without increasing the cost.

Japanese Patent Laid-Open No. 2005-182163 discloses a technology for using a device without problems even if the settings of the device are updated.

SUMMARY OF THE INVENTION

According to an embodiment of the present invention, a distribution apparatus includes a firmware distribution unit configured to distribute firmware corresponding to a post-update version to an image processing apparatus, the post-update version being the version of firmware that is involved in update and that is included in an acquisition request received from the image processing apparatus; a determination unit configured to determine whether migration of setup information stored in a storage unit in the image processing apparatus is necessary in the update of the firmware from a pre-update version to the post-update version, the pre-update version being the version of firmware that is included in the acquisition request and that is currently applied to the image processing apparatus, on the basis of the pre-update version, the post-update version, and data on the setup information in which combinations of the versions of firmware are associated with information indicating whether the migration of the setup information is necessary; and a setup-migration-program distribution unit configured to distribute a setup migration program involved in the migration of the setup information to the image processing apparatus if the determination unit determines that the migration of the setup information is necessary.

According to another embodiment of the present invention, an image processing apparatus storing setup information in its storage unit includes an information acquiring unit configured to acquire a post-update version that is the version of firmware involved in update from a monitoring center apparatus; an acquisition request transmitting unit configured to transmit an acquisition request including the post-update version acquired by the information acquiring unit and a pre-update version that is the version of firmware currently applied to the image processing apparatus to a distribution apparatus; a firmware application unit configured to apply firmware distributed from the distribution apparatus to update the firmware; and a setup-migration-program application unit configured to execute a setup migration program that is involved in migration of the setup information and that is distributed from the distribution apparatus to migrate the setup information.

According to another embodiment of the present invention, a monitoring system for an image processing apparatus includes the image processing apparatus storing setup information in its storage unit; a monitoring center apparatus configured to monitor the image processing apparatus; and a distribution apparatus configured to distribute firmware to the image processing apparatus. The monitoring center apparatus includes a display control unit configured to cause a firmware update specification screen on which a post-update version is specified to be displayed in a display unit, the post-update version being the version of firmware that is distributed to the image processing apparatus and that is involved in update. The image processing apparatus includes an information acquiring unit configured to acquire the post-update version specified on the firmware update specification screen from the monitoring center apparatus; and an acquisition request transmitting unit configured to transmit an acquisition request including the post-update version acquired by the information acquiring unit and a pre-update version that is the version of firmware currently applied to the image processing apparatus to the distribution apparatus. The distribution apparatus includes a firmware distribution unit configured to distribute the firmware corresponding to the post-update version included in the acquisition request to the image processing apparatus; a determination unit configured to determine whether migration of setup information stored in a storage unit in the image processing apparatus is necessary in the update of the firmware from the pre-update version to the post-update version on the basis of the pre-update version and the post-update version, which are included in the acquisition request, and data on the setup information in which combinations of the versions of firmware are associated with information indicating whether the migration of the setup information is necessary; and a setup-migration-program distribution unit configured to distribute a setup migration program involved in the migration of the setup information to the image processing apparatus if the determination unit determines that the migration of the setup information is necessary.

According to another embodiment of the present invention, an information processing method in a distribution apparatus includes the steps of distributing firmware corresponding to a post-update version to an image processing apparatus, the post-update version being the version of firmware that is involved in update and that is included in an acquisition request received from the image processing apparatus; determining whether migration of setup information stored in a storage unit in the image processing apparatus is necessary in the update of the firmware from a pre-update version to the post-update version, the pre-update version being the version of firmware that is included in the acquisition request and that is currently applied to the image processing apparatus, on the basis of the pre-update version, the post-update version, and data on the setup information in which combinations of the versions of firmware are associated with information indicating whether the migration of the setup information is necessary; and distributing a setup migration program involved in the migration of the setup information to the image processing apparatus if the determining determines that the migration of the setup information is necessary.

According to another embodiment of the present invention, an information processing method in an image processing apparatus storing setup information in its storage unit includes the steps of acquiring a post-update version that is the version of firmware involved in update from a monitoring center apparatus; transmitting an acquisition request including the acquired post-update version and a pre-update version that is the version of firmware currently applied to the image processing apparatus to a distribution apparatus; applying firmware distributed from the distribution apparatus to update the firmware; and executing a setup migration program that is involved in migration of the setup information and that is distributed from the distribution apparatus to migrate the setup information.

According to another embodiment of the present invention, an information processing method in a monitoring system for an image processing apparatus is provided. The monitoring system includes the image processing apparatus storing setup information in its storage unit; a monitoring center apparatus configured to monitor the image processing apparatus; and a distribution apparatus configured to distribute firmware to the image processing apparatus. The information processing method includes the steps of causing a firmware update specification screen on which a post-update version is specified to be displayed in a display unit, the post-update version being the version of firmware that is distributed to the image processing apparatus and that is involved in update, by the monitoring center apparatus; acquiring the post-update version specified on the firmware update specification screen from the monitoring center apparatus, by the image processing apparatus; transmitting an acquisition request including the acquired post-update version and a pre-update version that is the version of firmware currently applied to the image processing apparatus to the distribution apparatus, by the image processing apparatus; distributing the firmware corresponding to the post-update version included in the acquisition request to the image processing apparatus, by the distribution apparatus; determining whether migration of setup information stored in a storage unit in the image processing apparatus is necessary in the update of the firmware from the pre-update version to the post-update version on the basis of the pre-update version and the post-update version, which are included in the acquisition request, and data on the setup information in which combinations of the versions of firmware are associated with information indicating whether the migration of the setup information is necessary, by the distribution apparatus; and distributing a setup migration program involved in the migration of the setup information to the image processing apparatus if it is determined that the migration of the setup information is necessary, by the distribution apparatus.

Further features of the present invention will become apparent from the following description of exemplary embodiments with reference to the attached drawings.

BRIEF DESCRIPTION OF THE DRAWINGS

FIG. 2 is a block diagram showing an exemplary hardware configuration of a monitoring center host.

FIG. 3 is a block diagram showing an exemplary hardware configuration of a monitoring apparatus.

FIG. 4 is a block diagram showing another exemplary hardware configuration of the monitoring apparatus.

FIG. 5 is a block diagram showing an exemplary hardware configuration of an image forming apparatus.

FIG. 15 shows an example of a configuration information table.

FIG. 16 shows an example of a setup migration program table.

FIG. 19 includes diagrams showing examples of the memory map.

DESCRIPTION OF THE EMBODIMENTS

Systems are proposed, which automatically update firmware in response to instructions from monitoring apparatuses under the environments of the monitoring apparatuses remotely monitoring the operating states of peripheral apparatus, such as image processing apparatuses. In such a system, the image processing apparatus downloads firmware from a distribution apparatus. When the image processing apparatus is rebooted after the downloading, the image processing apparatus applies the firmware.

A typical current image processing apparatus uses a non-volatile memory, such as a static random access memory (SRAM), because the firmware holds setup information including operation settings. The image processing apparatus allocates in advance the areas used by multiple applications composing the firmware as a memory map. Each application reads out and writes the setup information, etc. from and into the non-volatile memory, such as the SRAM, in accordance with the memory map.

For example, when the memory map in the SRAM is modified due to addition or deletion of the firmware or due to a change in the specifications of the firmware, for example, in upgrade of the firmware, the image processing apparatus automatically initializes and activates the SRAM when the firmware is activated after the upgrade. However, since the setup information held in the SRAM is also initialized in this case, an address book, user mode-service mode settings, and job information are also initialized. In order to avoid such a situation, it is necessary for a service man to temporarily save the setup information, etc. immediately before the upgrade outside the device and to rewrite the saved setup information, etc. after the upgrade on site.

Particularly, such a field work by the service man should be prevented from occurring in the remote upgrade using a distribution server in order to efficiently realize the upgrade with little field work.

Embodiments of the present invention will herein be described with reference to the attached drawings.

Figure 1:
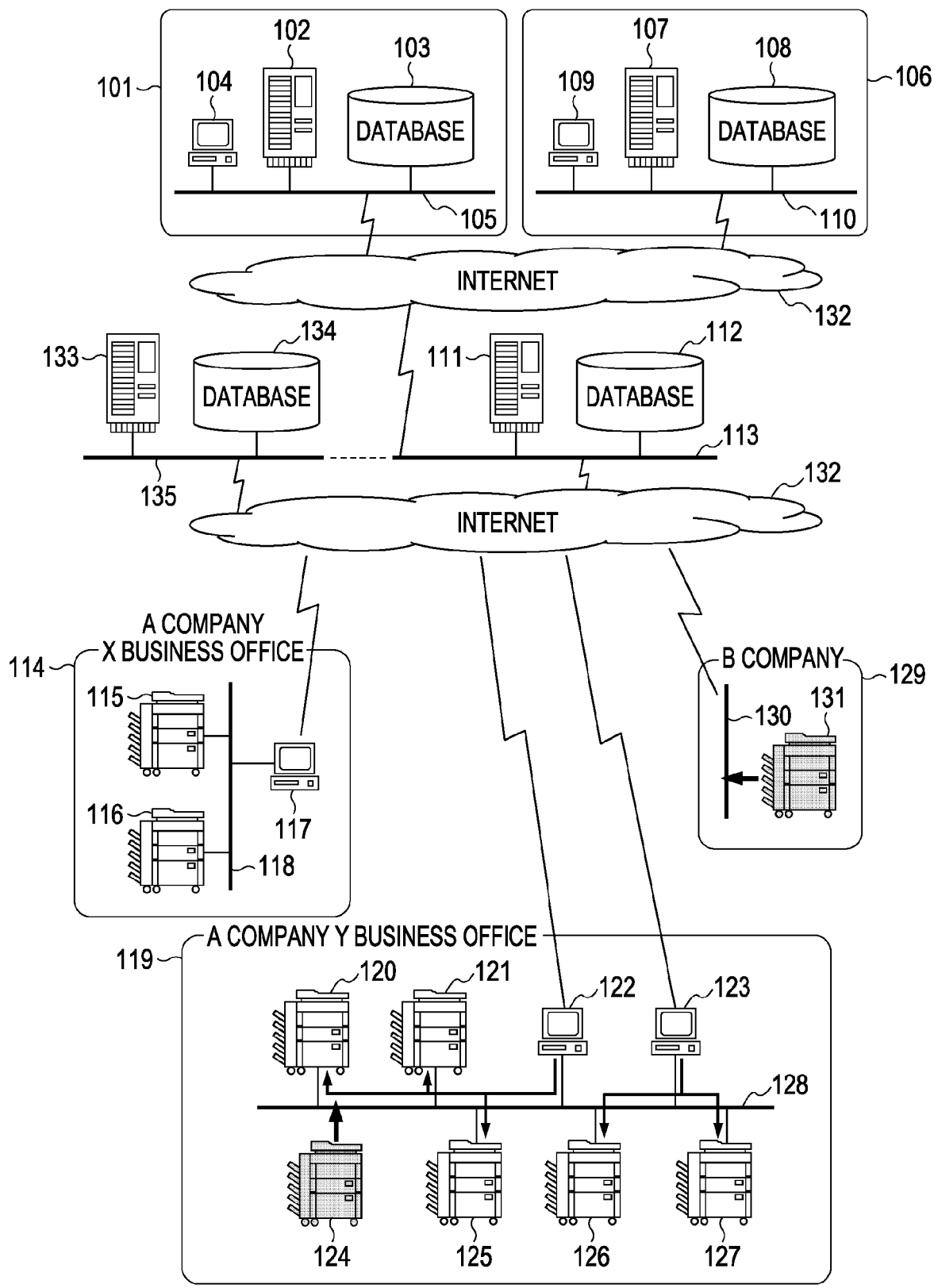
FIG. 1 illustrates an example of the system configuration of a monitoring system according to an embodiment of the present invention.

FIG. 1 illustrates an example of the system configuration of a monitoring system according to an embodiment of the present invention. Referring to FIG. 1, the monitoring system has multiple sales company systems including sales company systems 101 and 106 connected thereto.

The sales company systems 101 and 106 include hosts 102 and 107, databases 103 and 108, and personal computers (PCs) 104 and 109, respectively. The databases 103 and 108 each store sale information about customers within the jurisdiction of the sales company and information about the monitoring system. The PCs 104 and 109 perform control processes, such as registration of data in the respective databases 103 and 108 and modification of data therein. The PCs 104 and 109 access Web sites provided by a monitoring center host 111 to, for example, browse the data. The hosts 102 and 107 each include an operation unit and a display unit (display apparatus) and may also serve as the PCs 104 and 109, respectively. The host 102, the database 103, and the PC 104 are connected to each other via a local area network (LAN) 105. The host 107, the database 108, and the PC 109 are connected to each other via an LAN 110. Although each of the sales company systems includes multiple apparatuses in the example shown in FIG. 1, each sales company system may not include multiple apparatuses as long as it can achieve functions described below. For example, the databases 103 and 108 may be physically included in the hosts 102 and 107, respectively. In addition, the databases 103 and 108 may be provided at other positions via the Internet 132 as long as the hosts 102 and 107 can access the databases 103 and 108, respectively.

The monitoring center host 111 is provided between the sales company systems and the customers. A database 112 serves as a history storing unit that stores information used for monitoring, counters of an image forming apparatus, that is an example of the image processing apparatus, fault history information, a fault pattern table, and so on. The counters of the image forming apparatus, the fault history information, and the fault pattern table are collected from the customers. The monitoring center host 111 is connected to the database 112 via an LAN 113. The LAN 113 is capable of being connected to the Internet 132. The database 112 may be physically included in the monitoring center host 111. In addition, the database 112 may be provided at another position via the Internet 132 as long as the monitoring center host 111 can access the database 112. According to the present embodiment, it is preferable that the image forming apparatus be a printer, a scanner, a facsimile, or a multifunction machine of these apparatuses. The image forming apparatus is not restricted to the multifunction machine and may be a printer.

The monitoring center host 111 collects information about the image forming apparatuses to be monitored and information indicating the operation states (including fault information) from monitoring apparatuses 117, 122, and 123 and an image forming apparatus 131, stores the above information or processes the above information, and externally supplies a warning and the like. For example, the monitoring center host 111 has a function of distributing the above information to the hosts 102 and 107. The information indicating the operation states includes out-of-toner, an opened door, drum replacement, no cartridge, a cooling fan failure, a circuit board failure, dirty glass of a document table, out-of-staple, and out-of-light-intensity at a paper feed sensor. The information indicating the operation states also includes overflow of a font memory, a rendering error, a fixing device failure, a counter failure, a duplex unit failure, and paper jam. The counter information concerns an accounting counter of each sales company, a department counter counting by department in the customer companies, a size counter counting by size, and a parts counter indicating the consumption levels of parts in each image forming apparatus.

The accounting counter counts the number of prints by each image forming apparatus. The department counter counts the number of prints for every department set by each customer. The parts counter counts the number of revolutions in the case of a part, such as a drum, and counts time (second) in the case of a scanner lamp. These pieces of information form the information about the operation states.

Each of the hosts 102 and 107 can register information about the image forming apparatuses to be monitored and settings concerning the monitoring in the monitoring center host 111. The monitoring center host 111 can merge and integrally manage the information about the image forming apparatuses to be monitored and the settings concerning the monitoring, which are registered by the hosts of the sales companies. In addition, the monitoring center host 111 can make settings concerning the monitoring for the monitoring apparatuses 117, 122, and 123 and the image forming apparatus 131.

The services of the monitoring system are provided on the basis of contracts between each sales company and its customers. Accordingly, the monitoring system monitors only the image forming apparatuses which the sales companies determine to monitor under the contracts. The monitoring center host 111 provides Web pages to the PCs connected to the monitoring center host 111 via the Internet 132 and the PCs browse information stored in the database 112 or processed information on the Web pages. The monitoring center host 111 performs user authentication to restrict the content of browsing by sales company, by customer, and by user right and provides the restricted content of browsing on the Web pages. The monitoring center host 111 can modify part of data from the Web pages.

A distribution server 133 is provided between the sales company systems and the customers. A database 134 serves as a history storing unit that stores information about firmware to be applied to the image forming apparatuses, applications, a software license, and so on. The distribution server 133 is connected to the database 134 via an LAN 135. The LAN 135 is capable of being connected to the Internet 132. The database 134 may be physically included in the distribution server 133. In addition, the database 134 may be provided at another position via the Internet 132 as long as the distribution server 133 can access the database 134. The LAN 113 may be integrated with the LAN 135 and the database 134 may share the data with the database 112.

Only one monitoring center host 111, one database 112, one distribution server 133, and one database 134 are shown in FIG. 1. However, distributed processing may be performed between multiple monitoring center hosts and databases to collect information from many image forming apparatuses and monitoring apparatuses and to share the load of the firmware distribution.

An example of a system configuration at the customer side will now be described. Different customers have different environments. Customer systems 114, 119, and 129 are shown in the monitoring system in FIG. 1. In the customer system 114 (A company X business office), the monitoring apparatus 117 connected to an LAN 118 that is connected to the Internet 132 monitors image forming apparatuses 115 and 116. The monitoring apparatus 117 communicates with the monitoring center host 111 via the Internet 132. In the customer system 119 (A company Y business office), the monitoring apparatuses 122 and 123 manage image forming apparatuses on an LAN 128. The monitoring apparatus 122 manages image forming apparatuses 120, 121, 124, and 125. The monitoring apparatus 123 manages image forming apparatuses 126 and 127. The monitoring apparatuses 117, 122, and 123 are connected to databases (not shown). The monitoring apparatuses store information collected from the image forming apparatuses, store the results of processing of the stored data, and store settings concerning the monitoring of the image forming apparatuses in the databases (not shown). The databases (not shown) may be connected to LAN 118 or the LAN 128 and may be independently provided. In addition, the databases (not shown) may be provided at other positions via the Internet 132 as long as the monitoring apparatuses 117, 122, and 123 can access the databases. The monitoring apparatuses each transmit state information (for example, an occurrence of fault) about the image forming apparatuses to the monitoring center host 111 each time such information is received from the image forming apparatuses.

In the customer system 129 (B company), the image forming apparatus 131 connected to an LAN 130 that is connected to the Internet 132 directly communicates with the monitoring center host 111 via the Internet 132. The image forming apparatus 131 positively transmits its information (for example, the counter information and/or an occurrence of fault or the like) to the monitoring center host 111. A PC (not shown) in the image forming apparatus 131 has a Web browser installed therein and can be connected to the monitoring center host 111 not only from the customer environment but also directly via the Internet 132 to browse the Web pages provided by the monitoring center host 111.

The following points should be kept in mind:
(1) Hypertext Transfer Protocol (HTTP)/Simple Object Access Protocol (SOAP) can be used in the communication via the Internet 132 in the above configuration. The SOAP is a protocol used for invoking data or a service of one computer from another computer on the basis of Extensible Markup language (XML). In this example, the SOAP is installed in the HTTP. SOAP messages in which additional information is attached to XML documents are exchanged in the communication by the SOAP. Accordingly, a typical computer supporting the SOAP includes a SOAP message generating unit generating SOAP messages and a SOAP message interpreting unit interpreting SOAP messages. The state information about the image forming apparatuses is transmitted to the monitoring center host 111 using the SOAP messages in the present embodiment.
(2) Each image forming apparatus in the A company communicates with the monitoring center host 111 via the monitoring apparatus in the above description. However, changing the settings allows each image forming apparatus in the A company to communicate with the monitoring center host 111 via no monitoring apparatus, as in the image forming apparatus 131 in the B company.

FIG. 2 is a block diagram showing an exemplary hardware configuration of the monitoring center host 111. The distribution server 133 and the hosts 102 and 107 also have the hardware configuration shown in FIG. 2. Referring to FIG. 2, a first central processing unit (CPU) 201 and a second CPU 202 control each processing in the apparatus. A read only memory (ROM) 203 stores programs and data concerning each processing in the apparatus and is not rewritable. A read only memory (RAM) 204 electrically stores temporary data concerning each processing in the apparatus and is rewritable. A first hard disk drive (HDD) 205 and a second HDD 206 store programs and data concerning each processing in the apparatus, temporary data, information about the image forming apparatus to be monitored according to the present embodiment, information collected from the image forming apparatus, and so on. For example, the parts counter, the accounting counter, and the department counter are stored in the HDDs. An input device 207 is a keyboard or a pointing device receiving instructions for the apparatus. A display unit (display apparatus) 208 displays the operating status of the apparatus and information output from each program running on the apparatus. A network interface (I/F) 209 is connected to a LAN and the Internet via a network to externally perform information exchange. An external device interface (I/F) 210 is connected to an external storage device or the like. The above components are connected to each other via a system bus 211 to exchange data.

FIG. 3 is a block diagram showing an exemplary hardware configuration of the monitoring apparatuses 117, 122, and 123. The PCs 104 and 109 also have the hardware configuration in FIG. 3. Referring to FIG. 3, a CPU 301 controls each processing in the apparatus. A ROM 302 stores programs and data concerning each processing in the apparatus and is not rewritable. A RAM 303 electrically stores temporary data concerning each processing in the apparatus and is rewritable. In the monitoring apparatus 117, programs and data concerning each processing in the apparatus, temporary data, information about the image forming apparatus to be monitored, information collected from the image forming apparatus, and so on are stored in an HDD 304. In the PCs 104 and 109, a Web browser etc. are stored in the HDD 304. An input device 305 is a keyboard or a pointing device receiving instructions for the apparatus. A display unit (display apparatus) 306 displays the operating status of the apparatus and information output from each program running on the apparatus. A network interface (I/F) 307 is connected to a LAN and the Internet via a network to externally perform information exchange. An external device interface (I/F) 308 is connected to an external storage device or the like. The above components are connected to each other via a system bus 309 to exchange data.

FIG. 4 is a block diagram showing another exemplary hardware configuration of the monitoring apparatuses 117, 122, and 123. Referring to FIG. 4, a CPU 401 controls each processing in the apparatus. A ROM 402 stores programs and data concerning each processing in the apparatus and is not rewritable. A flash ROM 403 stores programs and data concerning each processing in the apparatus, temporary data, information about the image forming apparatus to be monitored, information collected from the image forming apparatus, and so on. An error or a log is output from the CPU 401 operating on the basis of the programs on the apparatus through a serial interface (I/F) 404 that can be connected to, for example, a terminal through a serial cable. A network interface (I/F) 405 is connected to a LAN and the Internet via a network to externally perform information exchange. The above components are connected to each other via a system bus 406 to exchange data.

FIG. 5 is a block diagram showing an exemplary hardware configuration of the image forming apparatus 115, 116, 120, 121, 124, 125, 126, 127, and 131. Specifically, the image forming apparatus is, for example, a multifunction machine in which printer and facsimile functions are integrated, an electrophotographic or inkjet printer that receives data from a PC etc. and prints the received data, a scanner, or a facsimile. A multifunction machine is shown in FIG. 5 as an example of the image forming apparatus.

Referring to FIG. 5, an image reader 502 reads an image of a document on a document feeder 501. The image reader 502 and an image former 503 convert data on the image of the document that is read or data received via a network into a print image and print out the print image. A paper ejector 504 ejects a sheet of paper on which a print image is printed and performs sorting, stapling, and so on. A network interface (I/F) 505 is connected to a LAN and the Internet via a network to externally perform information exchange. A CPU 506 controls each processing in the apparatus. The CPU 506 monitors the operating state of the image forming apparatus on the basis of programs and transmits state information indicating the state to a destination that is set in advance, if a certain event, such as a failure, occurs. The destination is, for example, the monitoring center host 111 or the monitoring apparatus. A ROM 507 serving as a non-volatile storage unit stores programs and data concerning each processing in the apparatus. A re-writable RAM 508 electrically stores temporary data concerning each processing in the apparatus. An HDD 509 stores programs and data concerning each processing in the apparatus, temporary data, user data transmitted to the apparatus, and so on. An operation unit 510 receives instructions input in the apparatus. A display unit (display apparatus) 511 displays the operation state of the apparatus and information concerning the operation with the operation unit 510. The above components are connected to each other via a system bus 512 to exchange data.

The image forming apparatus 131 having a function of positively transmitting information for the monitoring stores programs and data concerning the transmission of monitored data in the ROM 507 or the HDD 509.

Figure 6:
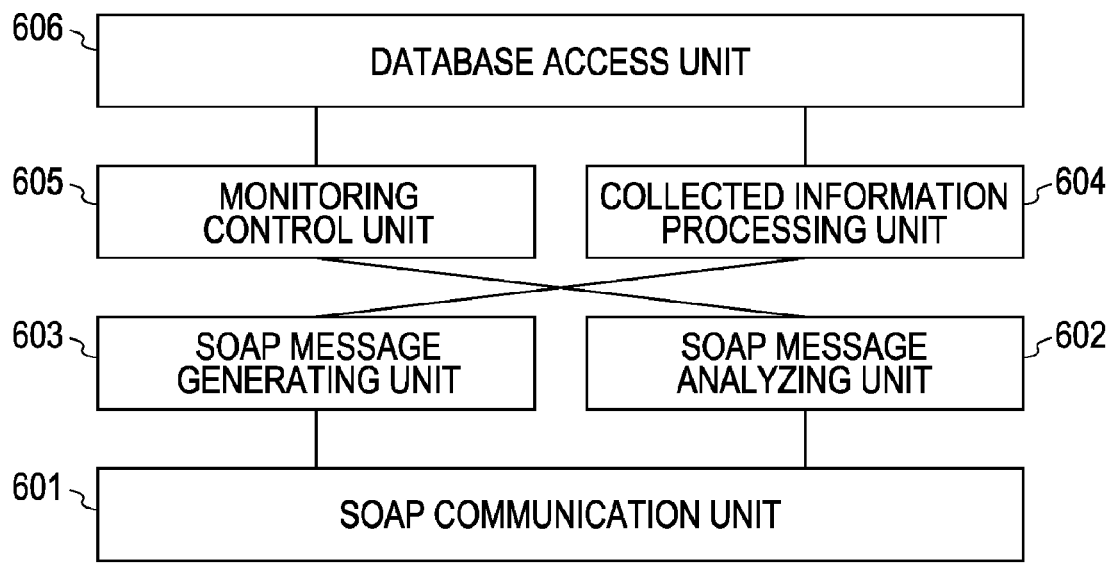
FIG. 6 is a block diagram showing an exemplary software configuration according to an embodiment of the present invention in the monitoring center host and a distribution server.

FIG. 6 is a block diagram showing an exemplary software configuration according to the present embodiment in the monitoring center host 111 and the distribution server 133.

Referring to FIG. 6, a SOAP communication unit 601 passes SOAP data received from the monitoring apparatus 117 or the image forming apparatus 131 through the network interface 209 to a SOAP message analyzing unit 602. In addition, the SOAP communication unit 601 transmits SOAP data generated by a SOAP message generating unit 603 to the monitoring apparatus 117 or the image forming apparatus 131 through the network interface 209.

A collected information processing unit 604 directly stores information received from the monitoring apparatus 117 or the image forming apparatus 131 that is monitored in the database 112 or the database 134, respectively, through a database access unit 606. Alternatively, the collected information processing unit 604 processes information received from the monitoring apparatus 117 or the image forming apparatus 131 that is monitored and stores the information resulting from the processing in the database 112 or the database 134, respectively, through the database access unit 606. In addition, the collected information processing unit 604 realizes a function concerning the remote monitoring system. For example, the collected information processing unit 604 notifies a service man in charge or a manager of the customer side of, for example, up-to-date information about the firmware on the basis of the information received from the monitoring apparatus 117 or the image forming apparatus 131 that is monitored and the data stored in the database 112 or the database 134. The collected information processing unit 604 notifies the service man in charge or the manager of the customer side of a sum of the counter information, error information, etc., in addition to the up-to-date information about the firmware.

A monitoring control unit 605 manages a schedule on which the information in the monitoring apparatus 117 or the image forming apparatus 131 is acquired and controls the content of the monitoring and the monitoring method. The monitoring control unit 605 transmits an instruction to the monitoring apparatus 117 or the database 134 that is monitored through the SOAP message generating unit 603, the SOAP communication unit 601, and the network interface 209, if needed.

Figure 7:
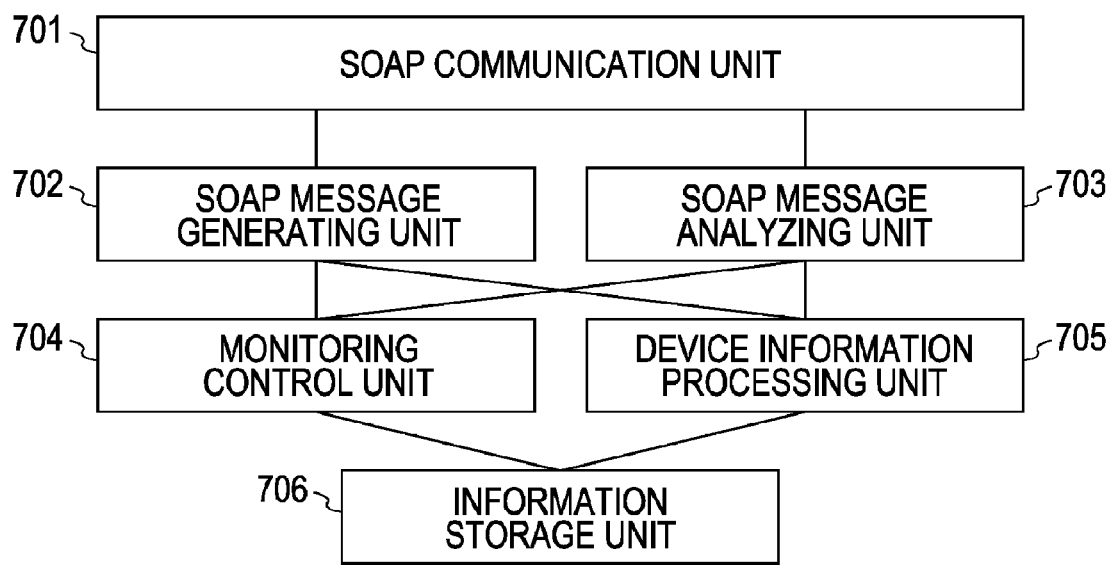
FIG. 7 is a block diagram showing an exemplary software configuration according to an embodiment of the present invention in the monitoring apparatus.

FIG. 7 is a block diagram showing an exemplary software configuration according to the present embodiment in the monitoring apparatuses 117, 122, and 123.

Referring to FIG. 7, a SOAP communication unit 701 passes SOAP data received from the monitoring center host 111 through the network interface 307 or the network interface 405 to a SOAP message analyzing unit 703. In addition, the SOAP communication unit 701 transmits SOAP data generated by a SOAP message generating unit 702 to the monitoring center host 111 and the distribution server 133 through the network interface 307 or the network interface 405.

For example, in the monitoring apparatus 117, a monitoring control unit 704 updates information about the monitoring image forming apparatus held in an information storage unit 706 in accordance with monitoring settings, described below, supplied from the monitoring center host 111 and acquires information about the image forming apparatuses 115 and 116 to perform schedule management.

In the monitoring apparatus 117, a device information processing unit 705 stores the counter information and information about a service call, paper jam, or out-of-toner which the apparatus has positively collected from the image forming apparatuses 115 and 116 in the information storage unit 706 according to the schedule managed by the monitoring control unit 704. Alternatively, the device information processing unit 705 performs the above storage process in accordance with the states of the image forming apparatuses 115 and 116.

The data stored in the information storage unit 706 is directly passed to the SOAP message generating unit 702 through the device information processing unit 705 and is transmitted to the monitoring center host 111 through the SOAP communication unit 701. Alternatively, the data stored in the information storage unit 706 is interpreted and processed in the device information processing unit 705, is passed to the SOAP message generating unit 702, and is transmitted to the monitoring center host 111 through the SOAP communication unit 701.

Figure 8:
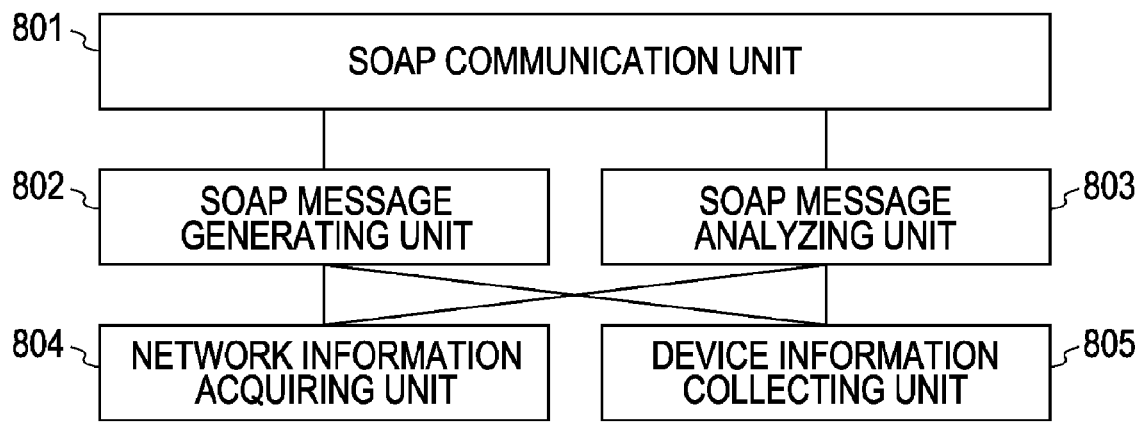
FIG. 8 is a block diagram showing an exemplary software configuration according to an embodiment of the present invention in the image forming apparatus.

FIG. 8 is a block diagram showing an exemplary software configuration according to the present embodiment in the image forming apparatuses 115, 116, 120, 121, 124, 125, 126, 127, and 131.

Referring to FIG. 8, a SOAP communication unit 801 passes SOAP data received from the monitoring center host 111 and the LAN 113 through the network interface 505 to a SOAP message analyzing unit 803. In addition, the SOAP communication unit 801 transmits SOAP data generated by a SOAP message generating unit 802 to the monitoring center host 111 and the distribution server 133 through the network interface 505.

A network information acquiring unit 804 is capable of automatically acquiring Internet Protocol (IP) addresses, Domain Name Server (DNS) addresses, and gateway address in a Dynamic Host Configuration Protocol (DHCP) environment. If network information that is input with the operation unit 510 and is stored in the HDD 509 is present, the network information acquiring unit 804 acquires this information.

A device information collecting unit 805 acquires the counter information that is held the multifunction machine and acquires information about a service call, paper jam, and out-of-toner that occurs in the multifunction machine according to the schedule in the multifunction machine or in response to an instruction from the monitoring center host 111. The data acquired by the device information collecting unit 805 is directly passed to the SOAP message generating unit 802 and is transmitted to the monitoring center host 111. The data that is acquired by the device information collecting unit 805 and that is stored, interpreted, and/or processed in the device information collecting unit 805 may be passed to the SOAP message generating unit 802 and may be transmitted to the monitoring center host 111.

Figure 9:
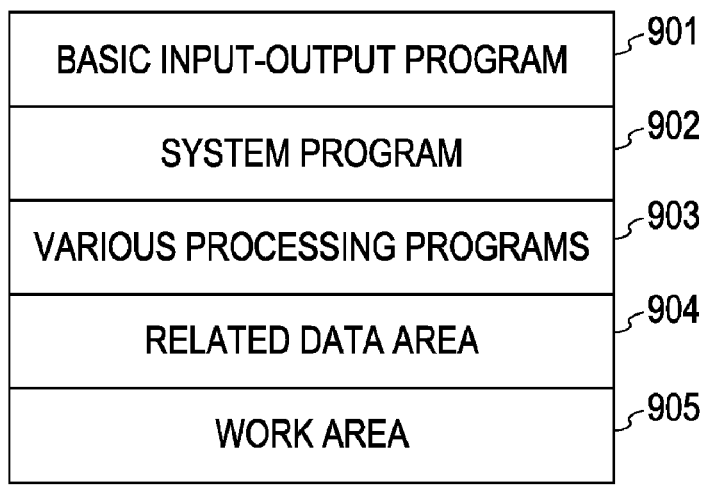
FIG. 9 illustrates an example of the configuration of a memory map in the monitoring center host and the distribution server, in the monitoring apparatus, or in the image forming apparatus.

FIG. 9 illustrates an example of the configuration of a memory map in the monitoring center host 111 and the distribution server 133, in the monitoring apparatuses 117, 122, and 123, or in the image forming apparatuses 115, 116, 120, 121, 124, 125, 126, 127, and 131. In the execution of a processing program according to the present embodiment, the program is loaded in the RAM 204 in the case of the monitoring center host 111, in the RAM 303 or the flash ROM 403 in the case of the monitoring apparatus, and in the RAM 508 in the case of the image forming apparatus.

The memory map includes a basic input-output program 901, a system program 902, various processing programs 903 including the processing program according to the present embodiment, a related data area 904 in which related data is stored, and a work area 905 of the program. The basic input-output program 901 controls input and output of data in and from the apparatus. The system program 902 provides the operating environment for each processing program. If the areas used as the basic input-output program 901 to the work area 905 are insufficient due to a restriction on the capacity, the first HDD 205 or the second HDD 206 may be used as part of the RAM 204, the HDD 304 may be used as part of the RAM 303, and the HDD 509 may be used as part of the RAM 508.

Figure 10:
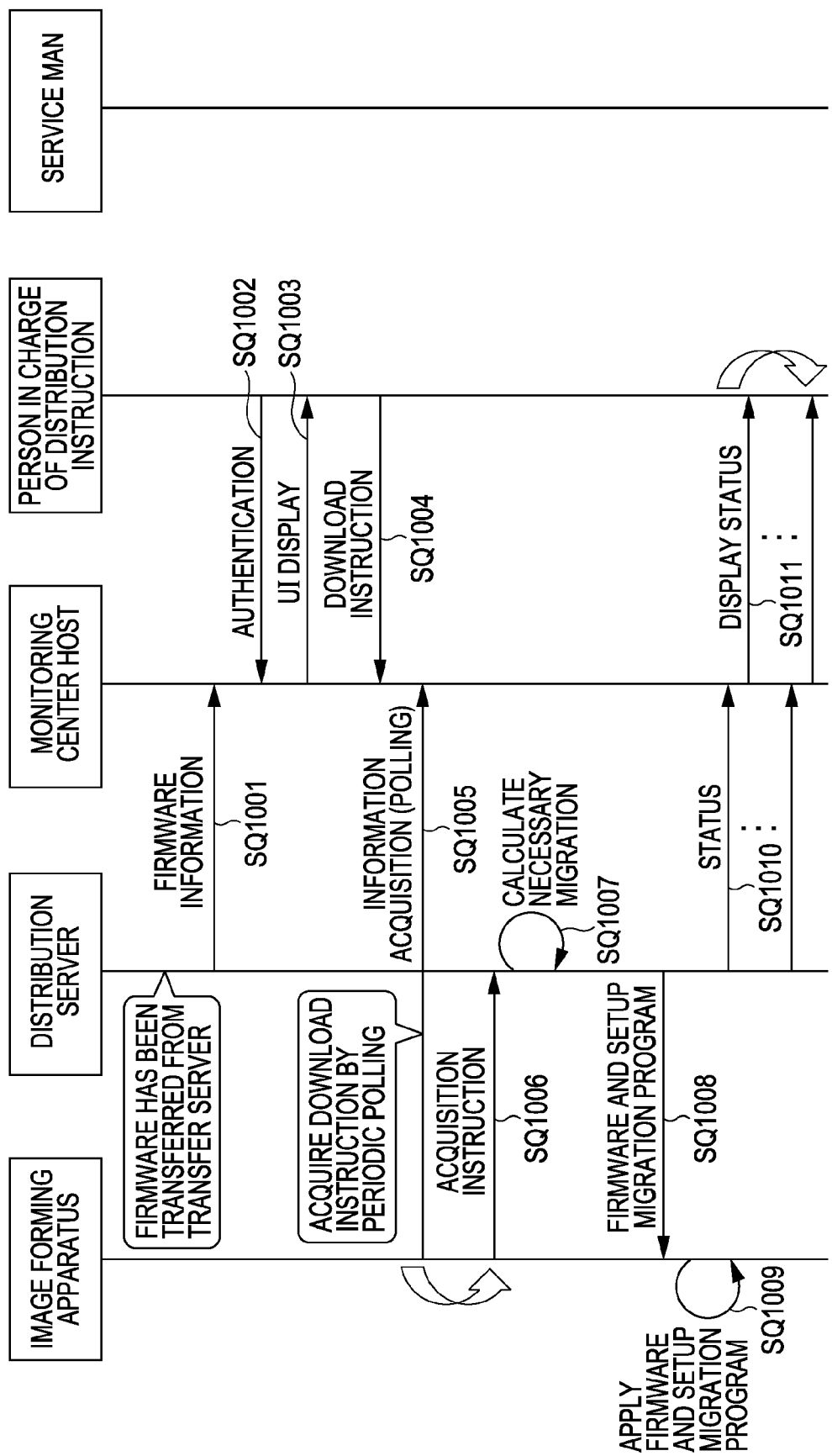
FIG. 10 is a flowchart showing an example of a distribution process of general firmware and a setup migration program in the image forming apparatus, the distribution server, the monitoring center host, and so on shown in FIG. 1.

FIG. 10 is a flowchart showing an example of a distribution process of general firmware and a setup migration program in the image forming apparatus, such as the image forming apparatus 124, the distribution server 133, the monitoring center host 111, and so on shown in FIG. 1. It is assumed that developed firmware has been transferred from a server (transfer server) that transfers the firmware to the distribution server 133 in advance. Referring to FIG. 10, in Step SQ1001, the distribution server 133 transmits firmware information to the monitoring center host 111. In other words, the monitoring center host 111 receives the firmware information from the distribution server 133. The firmware information indicates which version of firmware for which type of the image forming apparatus is prepared in the transfer server.

In Step SQ1002, a person in charge of distribution instruction in the sales company accesses the monitoring center host 111 to accept the authentication. In Step SQ1003, the monitoring center host 111 displays a user interface (UI) (controls the display). In Step SQ1004, the person in charge of distribution instruction in the sales company issues a download instruction in order to distribute the firmware of the specified version to the specified image forming apparatus. In Step SQ1005, the image forming apparatus 124 periodically performs polling to the monitoring center host 111 to acquire information indicating whether the download instruction is issued and the version (post-update version) of the firmware, etc. if the download instruction is issued.

If a firmware distribution command and a setup migration program distribution command, which are described below, are included in the information acquired from the monitoring center host 111, the image forming apparatus 124 transmits an acquisition instruction (an acquisition request) to the distribution server 133 in response to the instruction (transmission of the acquisition request). Specifically, in Step SQ1006, the image forming apparatus 124 transmits the instruction to acquire the firmware and the setup migration program, including the version of the firmware (pre-update version) currently applied to the image forming apparatus 124 and the post-update version, to the distribution server 133. In Step SQ1007, the distribution server 133 selects the firmware corresponding to the post-update version and the setup migration program involved in the update of the firmware from the pre-update version to the post-update version in response to the acquisition instruction. The setup migration program is a program file that updates the mapping of the memory map if the memory map of configuration information (setup information), such as user settings, on the SRAM included in the RAM 508 is updated in conjunction with the upgrade of the firmware. The selection of the setup migration program in the distribution server 133 will be described in detail with reference to FIG. 14. In Step SQ1008, the distribution server 133 distributes the firmware and the setup migration program to the image forming apparatus 124.

In Step SQ1009, the image forming apparatus 124 applies the distributed firmware and setup migration program.

The application of the firmware and the setup migration program will be described in detail with reference to FIG. 18. In Step SQ1010, the distribution server 133 returns the distribution status to the monitoring center host 111. In Step SQ1011, the monitoring center host 111 displays the status for the person in charge of distribution instruction in the sales company. The distribution server 133 may perform divided distribution depending on the size of the firmware and/or the setup migration program, and the series of operations for distributing the firmware and the setup migration program may be repeated several times.

Figure 11:
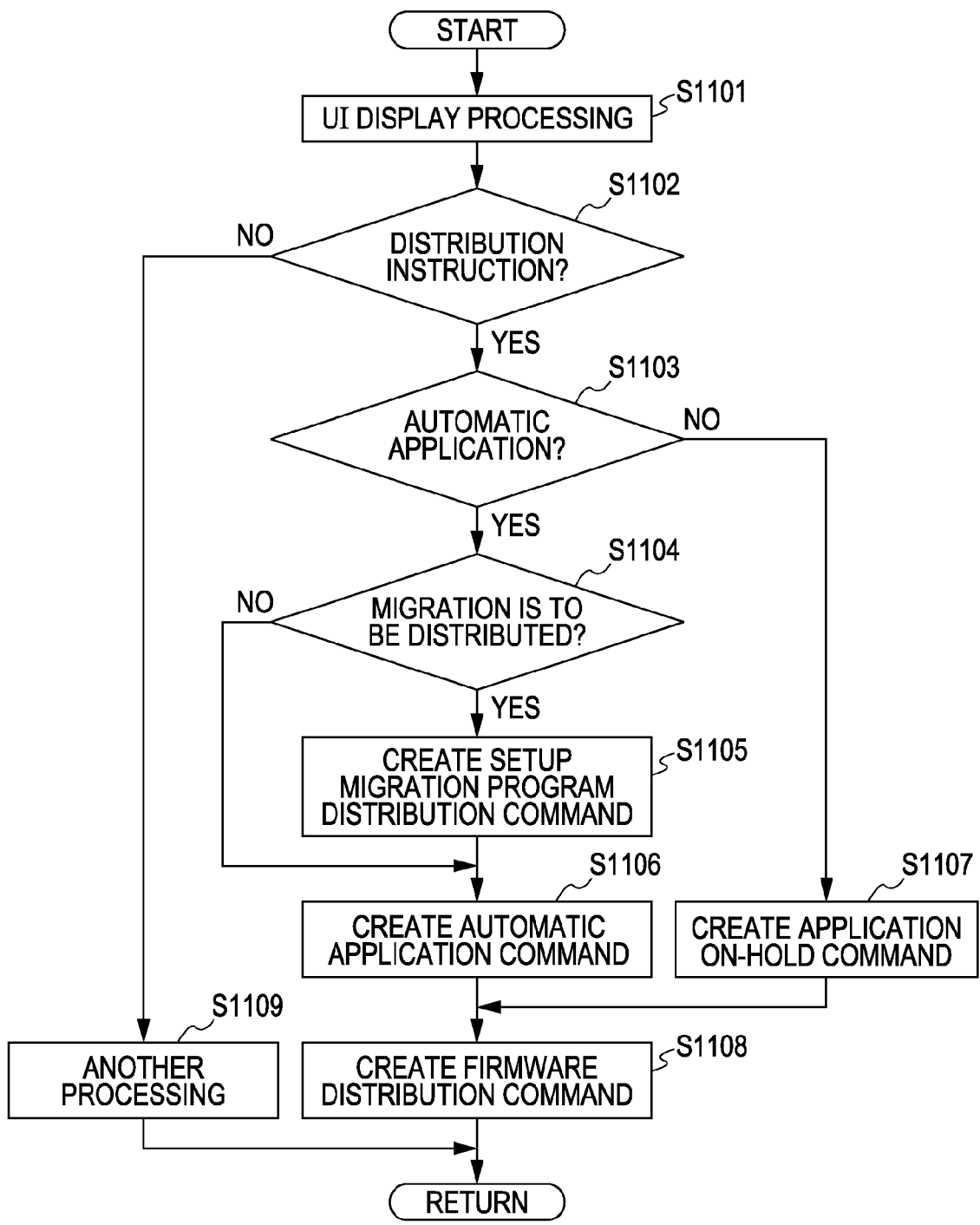
FIG. 11 is a flowchart showing an example of the process from UI display in the monitoring center host to a download instruction in FIG. 10.
Figure 12:
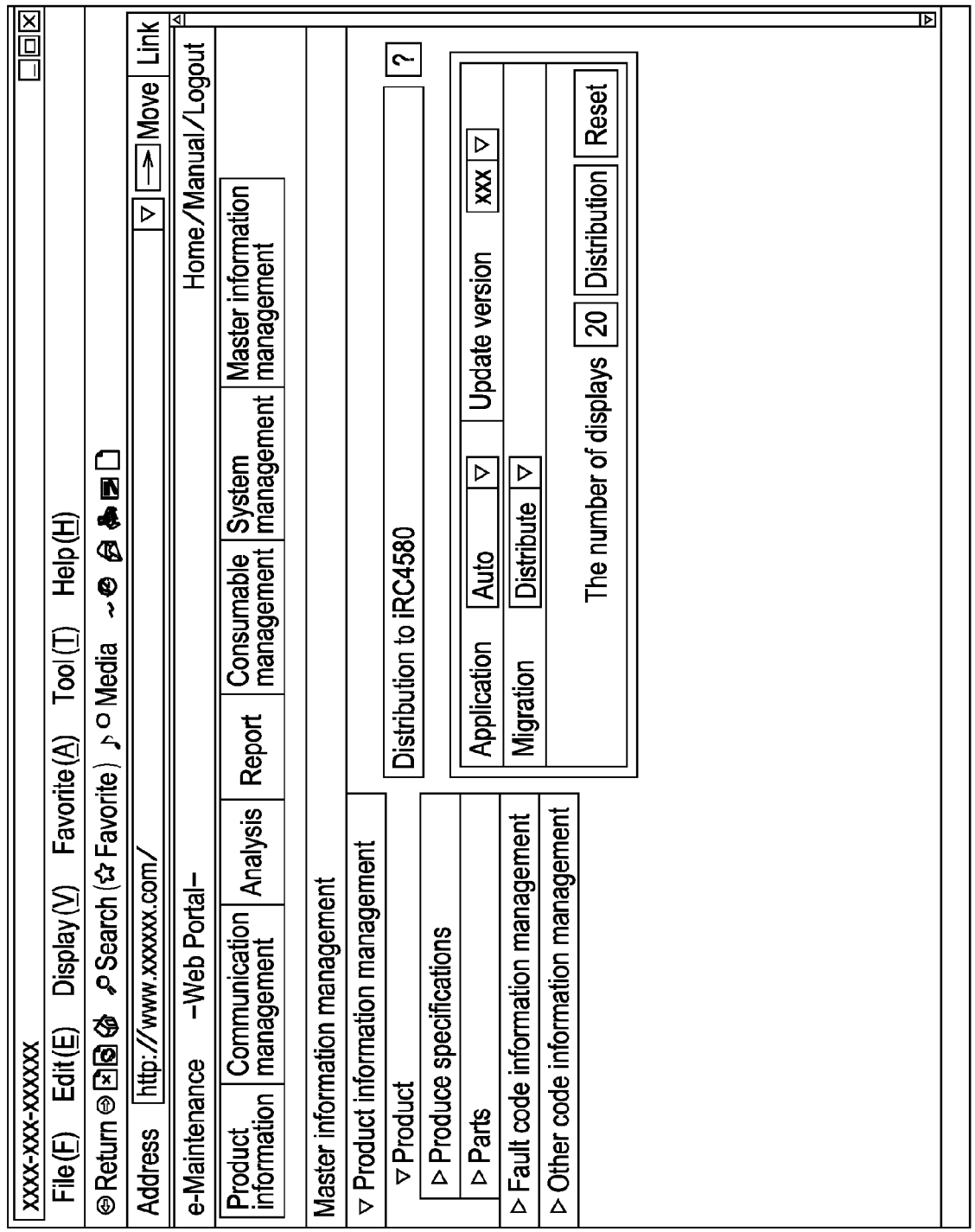
FIG. 12 illustrates an example of a UI (screen) that is displayed.

FIG. 11 is a flowchart showing an example of the process from the UI display in the monitoring center host 111 (Step SQ1003) to the download instruction (Step SQ1004). Referring to FIG. 11, in Step S1101, the monitoring center host 111 performs the UI display processing to prompt the person in charge of distribution instruction in the sales company to distribute the firmware. FIG. 12 illustrates an example of the UI (screen) displayed in Step S1101. The UI in FIG. 12, which is an example of an update specification screen, is used to prompt the person in charge of distribution instruction in the sales company to select the application method, etc. after the distribution of the firmware to a specific image forming apparatus is selected.

The person in charge of distribution instruction in the sales company can select "automatic/manual" application, the "presence or absence" of the distribution of the migration, and the "version" of the firmware to be distributed with the UI shown in FIG. 12. The migration means the setup migration program and is an expression of the setup migration program. The different initial values of these selections are set in the different image forming apparatuses, and the initial values are determined on the basis of the attributes included in the information about the firmware. It is assumed here that the "automatic application", the "presence of the distribution of the migration", and the "update version of 1.4" are selected by the person in charge of distribution instruction in the sales company to perform the distribution of the firmware.

Referring back to FIG. 11, in Step S1102, the monitoring center host 111 determines whether a distribution instruction is issued on the basis of the specification instruction (selection instruction) on the UI. If the monitoring center host 111 determines that the distribution instruction is issued (YES in Step S1102), the process goes to Step S1103. If the monitoring center host 111 determines that the distribution instruction is not issued (NO in Step S1102), the process goes to Step S1109. In Step S1109, the monitoring center host 111 performs another processing.

In Step S1103, the monitoring center host 111 determines whether the automatic application is selected on the basis of the specification instruction on the UI. If the monitoring center host 111 determines that the automatic application is selected (YES in Step S1103), the process goes to Step S1104. If the monitoring center host 111 determines that the automatic application is not selected (for example, a service man manually performs the application) (NO in Step S1103), the process goes to Step S1107.

In Step S1104, the monitoring center host 111 determines whether the migration (that is, the setup migration program) is to be distributed on the basis of the specification instruction on the UI. If the monitoring center host 111 determines that the migration is to be distributed (YES in Step S1104), the process goes to Step S1105. If the monitoring center host 111 determines that the migration is not to be distributed (NO in Step S1104), the process goes to Step S1106.

In Step S1105, the monitoring center host 111 creates the setup migration program distribution command to instruct the distribution of the setup migration program. In Step S1106, the monitoring center host 111 creates an automatic application command to instruct the automatic application of the firmware and the setup migration program. In Step S1107, the monitoring center host 111 creates an application on-hold command to instruct to put the application of the firmware and the setup migration program on hold.

In Step S1108, the monitoring center host 111 creates the firmware distribution command to instruct the distribution of the firmware. The monitoring center host 111 creates the firmware distribution command including information about the update version of the specified firmware on the basis of the specification instruction on the UI.

The steps from Step SQ1007 to Step SQ1008 in FIG. 10 will now be described with reference to FIGS. 13 and 14.

Figure 13:
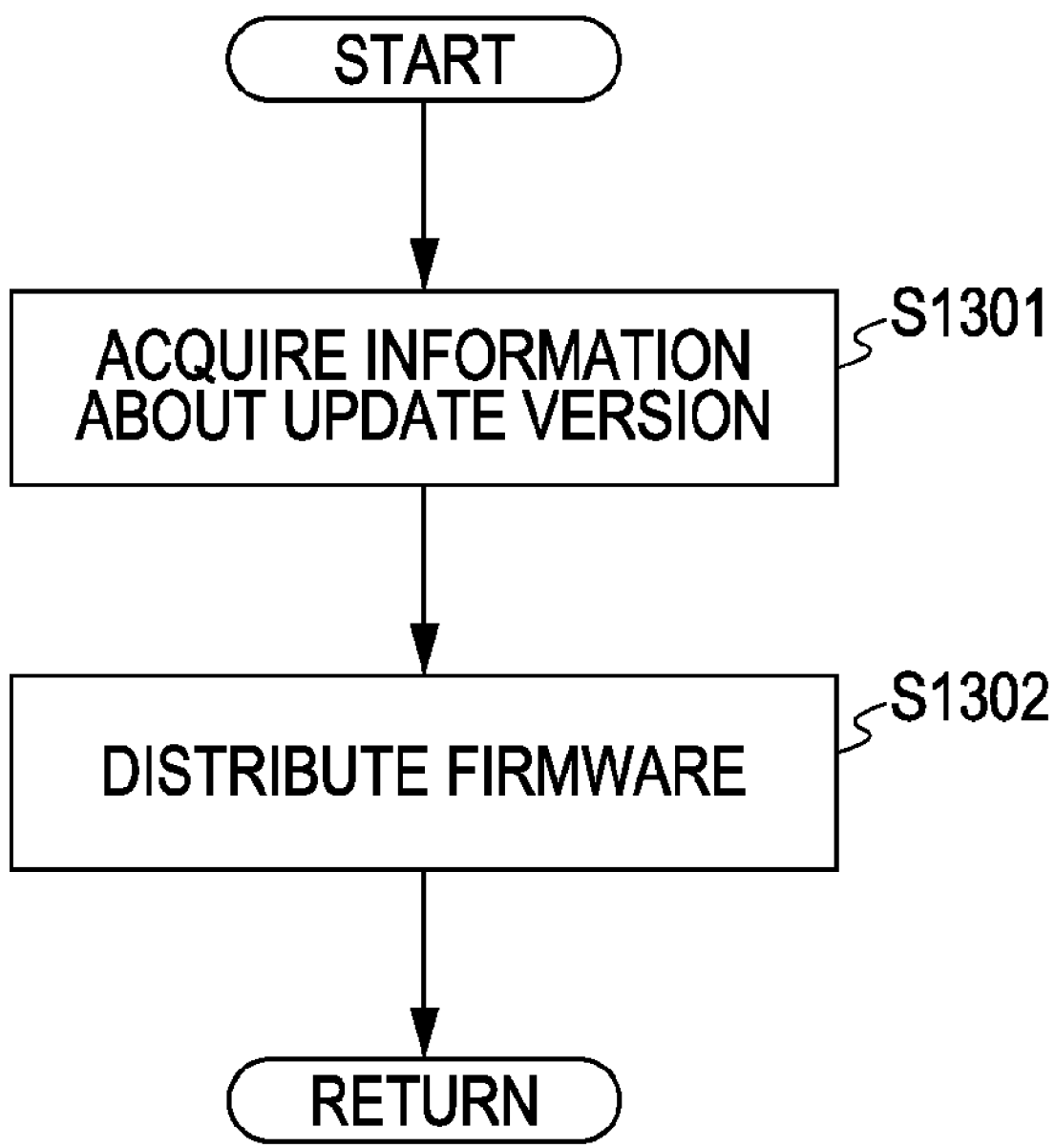
FIG. 13 is a flowchart showing an example of a distribution process of the firmware in the distribution server.

FIG. 13 is a flowchart showing an example of the distribution process of the firmware in the distribution server 133. The distribution server 133 starts the distribution process described below upon reception of the acquisition instruction from the image forming apparatus 124.

In Step S1301, the distribution server 133 acquires information about the update version included in the acquisition instruction received from the image forming apparatus 124.

In Step S1302, the distribution server 133 selects the firmware of the update version acquired in Step S1301 and distributes the selected firmware to the image forming apparatus 124 from which the acquisition instruction is transmitted.

Figure 14:
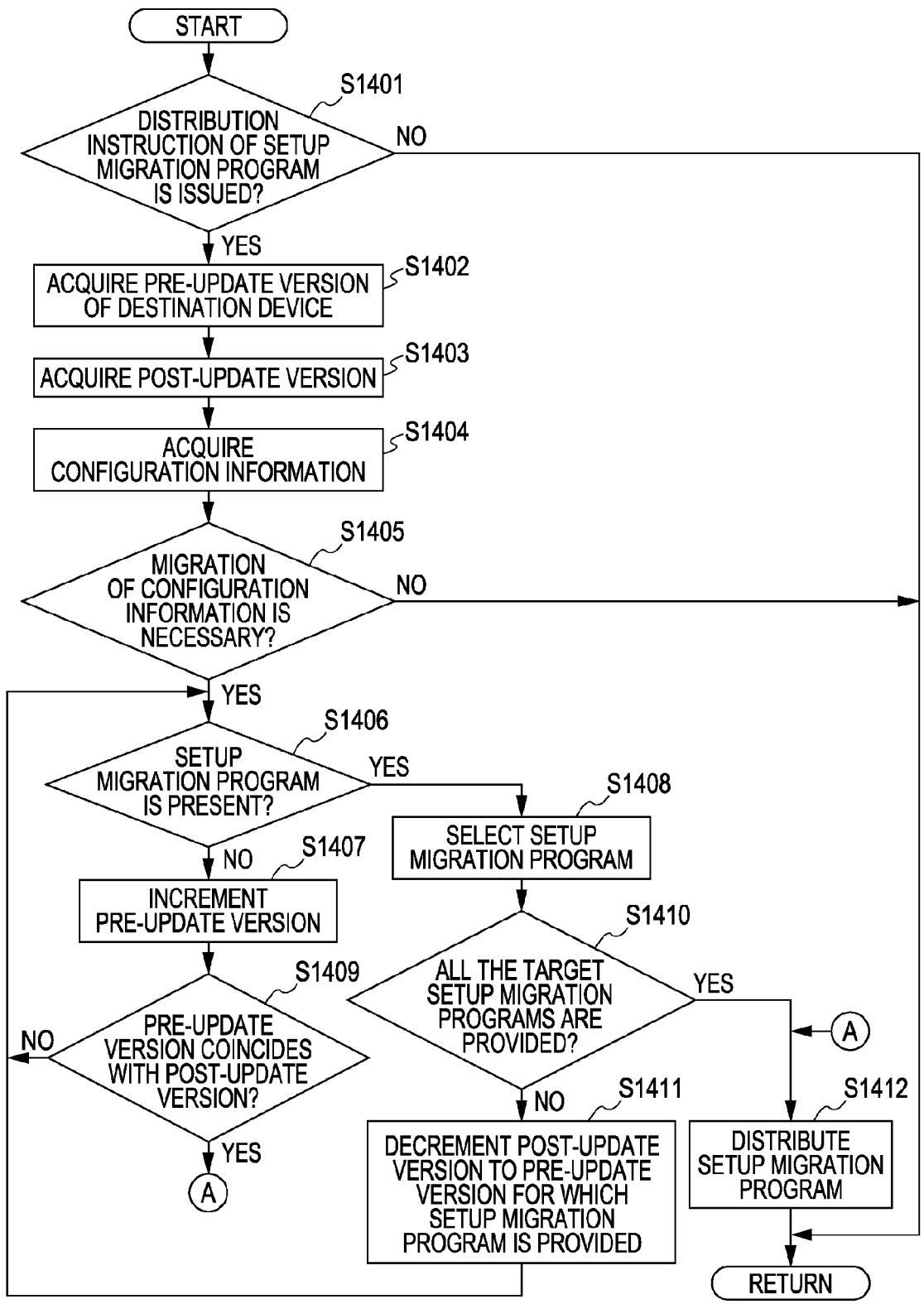
FIG. 14 is a flowchart showing an example of a distribution process of the setup migration program in the distribution server.

Then, the distribution server 133 performs a process shown in FIG. 14. FIG. 14 is a flowchart showing an example of the distribution process of the setup migration program in the distribution server 133.

In Step S1401, the distribution server 133 determines whether the distribution instruction of the setup migration program is issued on the basis of the acquisition instruction received from the image forming apparatus 124. The distribution server 133 determines that the distribution instruction of the setup migration program is issued if the acquisition instruction includes the distribution instruction of the setup migration program and the process goes to Step S1402. The distribution server 133 determines that the distribution instruction of the setup migration program is not issued if the acquisition instruction does not include the distribution instruction of the setup migration program and the process shown in FIG. 14 is terminated.

In Step S1402, the distribution server 133 acquires the pre-update version indicating the version of the firmware, which is included in the acquisition instruction and which is currently applied to the destination device, that is, the image forming apparatus 124. In Step S1403, the distribution server 133 acquires the post-update version indicating the version of the firmware, which is included in the acquisition instruction and which is to be (or has been) distributed to the image forming apparatus 124.

In Step S1404, the distribution server 133 searches a configuration information table shown in FIG. 15, which is an example of the setup information, on the basis of the pre-update version acquired in Step S1402 and the post-update version acquired in Step S1403 to acquire the corresponding information. FIG. 15 shows an example of the configuration information table. The configuration information table shown in FIG. 15 is stored in, for example, the hard disk of the distribution server 133. Referring to FIG. 15, "○" denotes that the firmware can be directly updated because the memory map composing the configuration information is not modified. "x" denotes that the migration of the configuration information is necessary because the memory map composing the configuration information is modified.

As shown in FIG. 15, combinations of the pre-update versions and the post-update versions of the firmware are associated with information indicating whether the migration of the setup information (configuration information) is necessary in the configuration information table.

Referring back to FIG. 14, in Step S1405, the distribution server 133 determines whether the migration of the configuration information (the setup information) is necessary on the basis of the information acquired in Step S1404 (that is, "○" or "x"). If the distribution server 133 determines that the migration of the configuration information is necessary (YES in Step S1405), the process goes to Step S1406. If the distribution server 133 determines that the migration of the configuration information is not necessary (NO in Step S1405), the process shown in FIG. 14 is terminated.

In Step S1406, the distribution server 133 searches a setup migration program table shown in FIG. 16, which is an example of the setup migration program data, on the basis of the pre-update version acquired in Step S1402 and the post-update version acquired in Step S1403 to acquire the corresponding information. FIG. 16 shows an example of the setup migration program table. The setup migration program table shown in FIG. 16 is stored in, for example, the hard disk of the distribution server 133. Referring to FIG. 16, "A", "B", and "C" denote setup migration programs (or identification information used for identifying the setup migration programs) necessary to migrate the setup information in conjunction with the upgrade of the firmware. "x" denotes that a dedicated setup migration program is not present.

As shown in FIG. 16, combinations of the pre-update versions and the post-update versions of the firmware are associated with information indicating whether the setup migration program is necessary, whether the setup migration program is present if the setup migration program is necessary, and the setup migration program if the setup migration program is present in the setup migration table.

The distribution server 133 determines in Step S1406 whether the setup migration program is present on the basis of the acquired information. If the distribution server 133 determines that the setup migration program is present (YES in Step S1406), the process goes to Step S1408. If the distribution server 133 determines that the setup migration program is not present (NO in Step S1406), the process goes to Step S1407.

In Step S1407, the distribution server 133 increments the pre-update version. In Step S1409, the distribution server 133 determines whether the pre-update version coincides with the post-update version. If the distribution server 133 determines that the pre-update version coincides with the post-update version (YES in Step S1409), the process goes to Step S1412. If the distribution server 133 determines that the pre-update version does not coincide with the post-update version (NO in Step S1409), the process goes back to Step S1406.

In Step S1408, the distribution server 133 selects the setup migration program on the basis of the information (the identification information used for identifying the setup migration program) acquired in Step S1406. In Step S1410, the distribution server 133 determines whether all the target setup migration programs, that is, all the setup migration programs corresponding to the update of the firmware from the pre-update version to the post-update version are provided. If the distribution server 133 determines that all the target setup migration programs are provided (YES in Step S1410), the process goes to Step S1412. If the distribution server 133 determines that all the target setup migration programs are not provided (NO in Step S1410), the process goes to Step S1411.

In Step S1411, the distribution server 133 decrements the post-update version to the pre-update version for which the setup migration program is provided and returns the pre-update version to the pre-update version acquired in Step S1402. Then, the process goes back to Step S1406. In Step S1412, the distribution server 133 distributes the setup migration program to the image forming apparatus 124 from which the acquisition instruction is transmitted.

The distribution process in FIG. 14 will now be described in a case where the pre-update version acquired in Step S1402 is "1.0" and the post-update version acquired in Step s1403 is "1.4". In Step S1404, the distribution server 133 acquires "x", that is, the information indicating that the migration of the configuration information is necessary from the configuration information table in FIG. 15. In Step S1405, the distribution server 133 determines that the migration of the configuration information is necessary.

In Step S1406, the distribution server 133 searches the setup migration program table in FIG. 16 on the basis of the pre-update version "1.0" and the post-update version "1.4" to acquire "x", that is, the information indicating that the dedicated setup migration program is not present as the corresponding information. Accordingly, in Step S1407, the distribution server 133 increments the pre-update version from "1.0" to "1.1". In Step S1409, the distribution server 133 determines that the pre-update version does not coincide with the post-update version because the pre-update version is "1.1" and the post-update version is "1.4" and the process goes back to Step S1406.

In Step S1406, the distribution server 133 searches the setup migration program table in FIG. 16 on the basis of the pre-update version "1.1" and the post-update version "1.4" to acquire "x", that is, the information indicating that the dedicated setup migration program is not present as the corresponding information. Accordingly, in Step S1407, the distribution server 133 increments the pre-update version from "1.1" to "1.2". In Step S1409, the distribution server 133 determines that the pre-update version does not coincide with the post-update version because the pre-update version is "1.2" and the post-update version is "1.4" and the process goes back to Step S1406.

When the pre-update version is "1.3" and the post-update version is "1.4" as the result of the repeat of the above steps, then in Step S1406, the distribution server 133 acquires the information identifying the setup migration program "C" from the setup migration program table in FIG. 16 as the corresponding information. Accordingly, in Step S1408, the distribution server 133 selects the setup migration program "C".

In Step S1410, the distribution server 133 determines whether all the setup migration programs corresponding to the update of the firmware from the pre-update version "1.0" to the post-update version "1.4" are provided. Since the setup migration program table shows that the setup migration program "C" corresponds to the update of the firmware from the version "1.3" to the version "1.4", the distribution server 133 determines that all the target setup migration programs are not provided and the process goes to Step S1411.

In Step S1411, the distribution server 133 decrements the post-update version "1.4" to the pre-update version "1.3" for which the setup migration program "C" is provided. The distribution server 133 returns the pre-update version "1.3" to the pre-update version "1.0" acquired in Step S1402 and the process goes back to Step S1406.

When the setup migration programs "A", "B", and "C" are provided as the result of the repeat of the above steps, the distribution server 133 determines in Step S1410 that all the target setup migration programs are provided from the setup migration program data and the process goes to Step S1412. In Step S1412, the distribution server 133 distributes the setup migration programs "A", "B", and "C" to the image forming apparatus 124 from which the acquisition instruction is transmitted.

Figure 17:
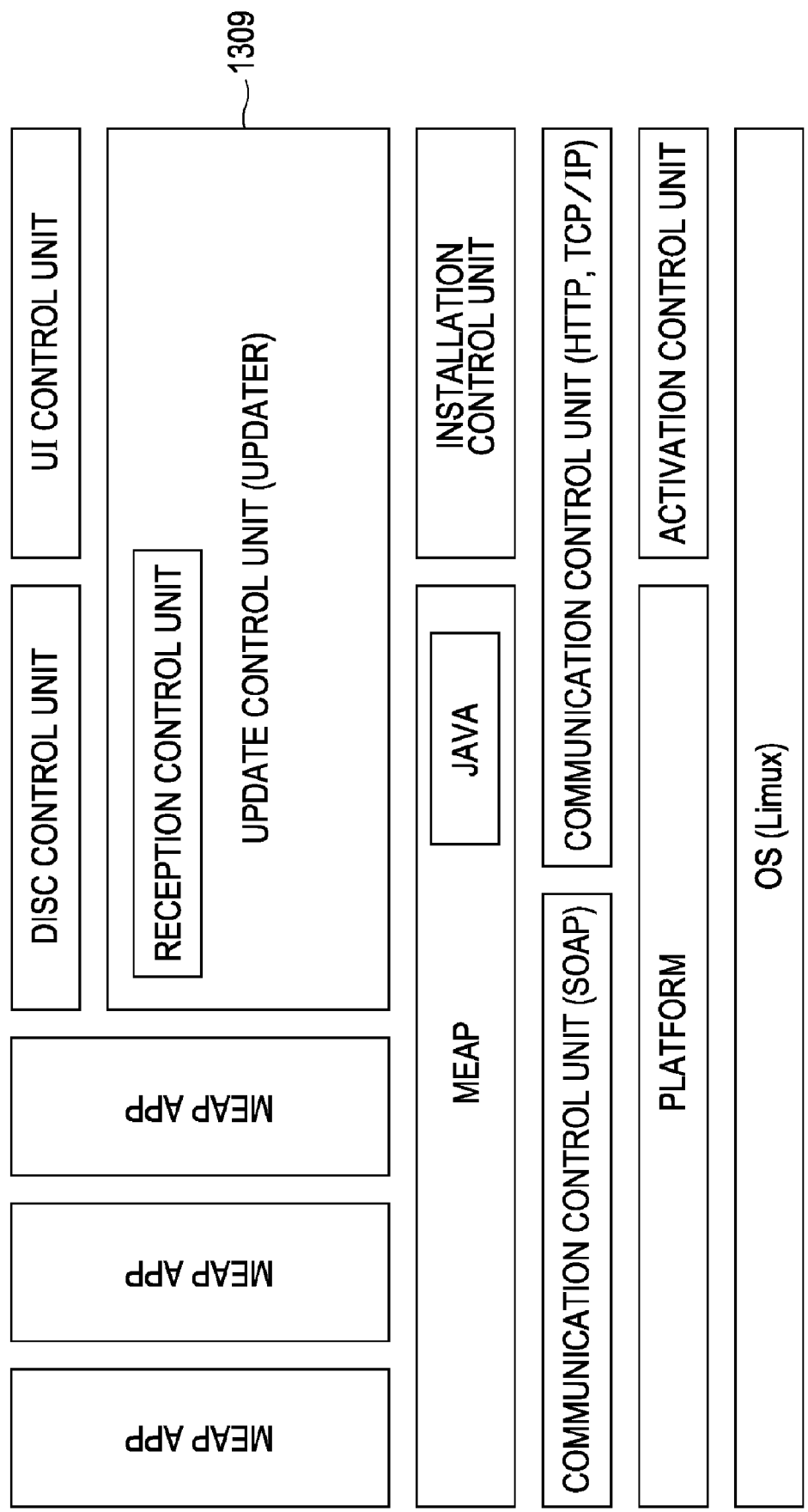
FIG. 17 shows an example of the software configuration of the image forming apparatus.

The process in Step SQ1009 in FIG. 10 will now be described in detail with reference to FIGS. 17 and 18. FIG. 17 shows an example of the software configuration of the image forming apparatus. FIG. 18 is a flowchart showing an example of the process of applying (updating) the firmware and the setup migration program in the image forming apparatus 124. The steps in the flowchart in FIG. 18 are performed by an update control unit 1309 in FIG. 17 unless otherwise specified. Specifically, after the CPU 506 reads out the update control unit 1309 (the program corresponding to the update control unit 1309) from the HDD 509 and writes the readout update control unit 1309 in the RAM 508, the CPU 506 performs the process on the basis of the update control unit 1309 (the program corresponding to the update control unit 1309).

Figure 18:
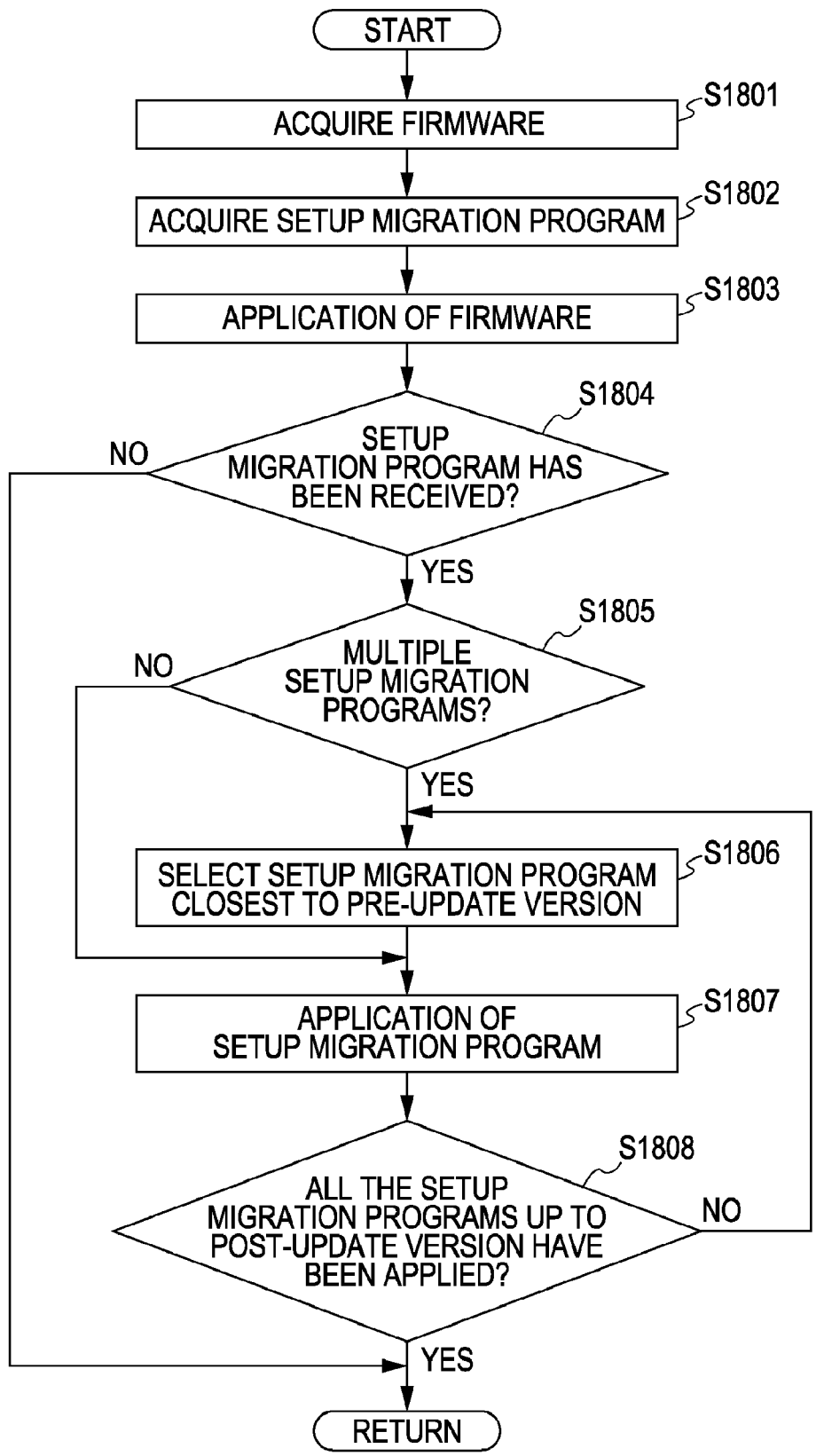
FIG. 18 is a flowchart showing an example of a process of applying (updating) the firmware and the setup migration program in the image forming apparatus.

Referring to FIG. 18, in Step S1801, the update control unit 1309 acquires the firmware distributed from the distribution server 133. In Step S1802, the update control unit 1309 acquires the setup migration program distributed from the distribution server 133.

In Step S1803, the update control unit 1309 applies the firmware acquired in Step S1801 (the application of the firmware). More specifically, the update control unit 1309 transfers the firmware acquired in Step S1801 to a specific area and extracts this firmware when the image forming apparatus 124 is rebooted to update the firmware to the new firmware. The method of applying the firmware according to the present embodiment is not restricted to the above one and the firmware may be applied to the image forming apparatus 124 by an arbitrary method.

In Step S1804, the update control unit 1309 determines whether the setup migration program has been received from the distribution server 133 in Step S1802. If the update control unit 1309 determines that the setup migration program has been received and the setup migration program is present at the specific area (YES in Step S1804), the process goes to Step S1805. If the update control unit 1309 determines that the setup migration program has not been received and the setup migration program is not present at the specific area (NO in Step S1804), the process shown in FIG. 18 is terminated.

In Step S1805, the update control unit 1309 determines whether multiple setup migration programs are acquired from the distribution server 133 in Step S1802. If the update control unit 1309 determines that multiple setup migration programs are acquired from the distribution server 133 in Step S1802 (YES in Step S1805), the process goes to Step S1806. If the update control unit 1309 determines that multiple setup migration programs are not acquired from the distribution server 133 in Step S1802 (NO in Step S1805), the program goes to Step S1807.

In Step S1806, the update control unit 1309 selects the setup migration program closest to the pre-update version from among the setup migration programs that have not been selected in the multiple setup migration programs (hereinafter referred to as a setup migration program group) acquired from the distribution server 133 in Step 1802. More specifically, the setup migration program group and information indicating that each setup migration program corresponds to the update of the firmware from which number version to which number version are transmitted from the distribution server 133. For example, the setup migration program "A" (from "1.1" to "1.2"), the setup migration program "B" (from "1.2" to "1.3"), the setup migration program "C" (from "1.3" to "1.4), and so on are transmitted from the distribution server 133. The update control unit 1309 selects the setup migration program "A" as the setup migration program closest to the original version, that is, the pre-update version (for example, "1.0") in the setup migration program group on the basis of the transmitted information.

The distribution server 133 may transmit the setup migration program table to the image forming apparatus 124, in addition to the setup migration program group. The setup migration program table may be synchronized between the distribution server 133 and the image forming apparatus 124.

In Step S1807, the update control unit 1309 applies the setup migration program selected in Step S1806 (the application of the setup migration program). More specifically, the update control unit 1309 executes the setup migration program selected in Step S1806 to migrate the setup information.

In Step S1808, the update control unit 1309 determines whether all the setup migration programs up to the target version, that is, up to the post-update version have been applied. If the update control unit 1309 determines that all the setup migration programs up to the target version have been applied (YES in Step S1808), the process shown in FIG. 18 is terminated. If the update control unit 1309 determines that all the setup migration programs up to the target version have not been applied (NO in Step S1808), the process goes back to Step S1806. The update control unit 1309 selects, for example, the setup migration program "B" in Step S1806 and applies the setup migration program "B" in Step S1807. As described above, the update control unit 1309 sequentially selects and applies the setup migration programs included in the setup migration program group to apply all the setup migration programs up to the post-update version.

FIG. 19 includes diagrams showing examples of the memory map. Specifically, FIG. 19(A) shows an example of the memory map in the firmware of the version "1.0" (1.1) FIG. 19(B) shows an example of the memory map in the firmware of the version "1.2". FIG. 19(C) shows an example of the memory map in the firmware of the version "1.3". FIG. 19(D) shows an example of the memory map in the firmware of the version "1.4".

Comparison between FIG. 19(B) and FIG. 19(A) shows that the area used by the application "A" is increased in FIG. 19(B). However, since the setup migration program "A" is applied, the application "B" can read the area used by the application "B" without fault.

The present invention can be embodied by supplying the storage medium (or the recording medium) including software program code realizing the functions according to the above embodiments to a system or an apparatus, the central processing unit (CPU or micro processing unit (MPU)) in which system or apparatus reads out and executes the program code stored in the storage medium. In this case, the program code itself read out from the storage medium realizes the functions according to the above embodiments. The present invention is applicable to the storage medium including the program code.

The operating system (OS) or the like running on the system or apparatus may execute all or part of the actual processing based on instructions in the program code that is read out and executed by the central processing unit in the system or apparatus to realize the functions of the embodiments described above.

Alternatively, after the program code read out from the storage medium has been written in a memory that is provided in a function expansion card included in the system or apparatus or in a function expansion unit connected to the system or apparatus, the CPU or the like in the function expansion card or the function expansion unit may execute all or part of the actual processing based on instructions in the program code to realize the functions of the embodiments described above.

In the application of the embodiments of the present invention to the storage medium, the program code corresponding to the flowcharts described above is stored in the storage medium.

According to the embodiments of the present invention described above, the distribution server can recognize the pre-update version of the image processing apparatus and the post-update version thereof, can automatically select the setup migration programs corresponding to all the versions between the two versions, and can distribute the setup migration programs along with the firmware. The image forming apparatus applies the firmware and sequentially executes the setup migration programs acquired from the distribution server to migrate the setup information. Accordingly, the setup information can be inherited without loss of the setup information at the upgrade. In other words, it is possible to efficiently update the firmware without loss of the setup information about the image processing apparatus.

In addition, according to the embodiments of the present invention described above, it is not necessary for the distribution server to prepare the setup migration programs corresponding to the combinations of all the versions in the preparation of the setup migration programs to inherit the setup information and it is sufficient for the distribution server to prepare only a small number of the setup migration programs.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-000678 filed Jan. 7, 2008, which is hereby incorporated by reference herein in its entirety.

What is claimed is:

1. A distribution apparatus comprising:
a firmware distribution unit configured to distribute firmware corresponding to a post-update version to an image processing apparatus, the post-update version being the version of firmware that is involved in update and that is included in an acquisition request received from the image processing apparatus;
a determination unit configured to determine whether migration of setup information stored in a storage unit in the image processing apparatus is necessary in the update of the firmware from a pre-update version to the post-update version, the pre-update version being the version of firmware that is included in the acquisition request and that is currently applied to the image processing apparatus, on the basis of the pre-update version, the post-update version, and data on the setup information in which combinations of the versions of firmware are associated with information indicating whether the migration of the setup information is necessary;
a setup-migration-program distribution unit configured to distribute a setup migration program involved in the migration of the setup information to the image processing apparatus if the determination unit determines that the migration of the setup information is necessary; and
a selecting unit configured to select the setup migration program corresponding to the update of the firmware from the pre-update version to the post-update version on the basis of the pre-update version, the post-update version, and data on the setup migration program in which combinations of the versions of firmware are associated with the setup migration programs,
wherein the setup-migration-program distribution unit distributes the setup migration program selected by the selecting unit to the image processing apparatus.

2. The distribution apparatus according to claim 1, wherein, if the update of the firmware from the pre-update version to the post-update version are performed multiple times, the selecting unit selects a plurality of setup migration programs corresponding to the updates.

3. An image processing apparatus storing setup information in its storage unit, the image processing apparatus comprising:
an information acquiring unit configured to acquire a post-update version that is a version of firmware involved in update from a monitoring center apparatus;
an acquisition request transmitting unit configured to transmit an acquisition request including the post-update version acquired by the information acquiring unit and a pre-update version that is the version of firmware currently applied to the image processing apparatus to a distribution apparatus;
a firmware application unit configured to apply firmware distributed from the distribution apparatus to update the firmware; and
a setup-migration-program application unit configured to execute a setup migration program that is involved in migration of the setup information and that is distributed from the distribution apparatus to migrate the setup information,
wherein, if multiple setup migration programs are used for the migration from the pre-update version to the post-update version, the setup-migration-program application unit sequentially executes the setup migration programs from the setup migration program closest to the pre-update version to migrate the setup information.

4. An information processing method in a distribution apparatus, the information processing method comprising:
distributing firmware corresponding to a post-update version to an image processing apparatus, the post-update version being the version of firmware that is involved in update and that is included in an acquisition request received from the image processing apparatus;
determining whether migration of setup information stored in a storage unit in the image processing apparatus is necessary in the update of the firmware from a pre-update version to the post-update version, the pre-update version being the version of firmware that is included in the acquisition request and that is currently applied to the image processing apparatus, on the basis of the pre-update version, the post-update version, and data on the setup information in which combinations of the versions of firmware are associated with information indicating whether the migration of the setup information is necessary; and
distributing a setup migration program involved in the migration of the setup information to the image processing apparatus if the determining determines that the migration of the setup information is necessary
selecting the setup migration program corresponding to the update of the firmware from the pre-update version to the post-update version on the basis of the pre-update version, the post-update version, and data on the setup migration program in which combinations of the versions of firmware are associated with the setup migration programs,
wherein the distributing distributes the selected setup migration program to the image processing apparatus.

5. The information processing method according to claim 4, wherein, if the update of the firmware from the pre-update version to the post-update version are performed multiple times, the selecting selects a plurality of setup migration programs corresponding to the updates.

6. An information processing method in an image processing apparatus storing setup information in its storage unit, the information processing method comprising:
acquiring a post-update version that is the version of firmware involved in update from a monitoring center apparatus;
transmitting an acquisition request including the acquired post-update version and a pre-update version that is the version of firmware currently applied to the image processing apparatus to a distribution apparatus;
applying firmware distributed from the distribution apparatus to update the firmware; and executing a setup migration program that is involved in migration of the setup information and that is distributed from the distribution apparatus to migrate the setup information, wherein, if multiple setup migration programs are used for the migration from the pre-update version to the post-update version, the executing sequentially executes the setup migration programs from the setup migration program closest to the pre-update version to migrate the setup information.

* * * * *